United States Patent [19]

Nakayama et al.

[11] 4,329,913

[45] May 18, 1982

[54] STRUCTURE OF A SHOE FOR A SWASH PLATE TYPE COMPRESSOR

[75] Inventors: Shozo Nakayama; Kimio Kato; Takamitu Mukai; Tomoo Fujii; Hiroya Kono, all of Kariya, Japan

[73] Assignee: Kabushiki Kaisha Toyoda Jidoshokki Seisakusho, Aichi, Japan

[21] Appl. No.: 55,469

[22] Filed: Jul. 6, 1979

[30] Foreign Application Priority Data

Jul. 19, 1978 [JP] Japan .............................. 53-99238[U]

[51] Int. Cl.³ ............................ F04B 1/16; F16C 17/03

[52] U.S. Cl. ......................................... 92/71; 417/269; 308/3 C

[58] Field of Search ............................. 92/71; 417/269; 308/3 C, 196; 91/502, 491

[56] References Cited

U.S. PATENT DOCUMENTS

| | | | |
|---|---|---|---|
| 1,694,938 | 12/1928 | Harris | 308/3 C |
| 2,920,488 | 1/1960 | Savage | 74/60 |
| 3,577,891 | 5/1971 | Nemoto | 417/269 |
| 3,951,569 | 4/1976 | Jacobs | 417/269 |
| 3,968,699 | 7/1976 | van Beukering | 91/499 |
| 3,999,893 | 12/1976 | Kishi | 417/269 |
| 4,090,430 | 5/1978 | Matsumoto | 417/269 |
| 4,132,154 | 1/1979 | Nishiba | 91/491 |
| 4,135,862 | 1/1979 | Degawa | 417/269 |

FOREIGN PATENT DOCUMENTS

| | | | |
|---|---|---|---|
| 180057 | 5/1922 | United Kingdom | 308/196 |

*Primary Examiner*—William L. Freeh

*Attorney, Agent, or Firm*—Burgess, Ryan and Wayne

[57] ABSTRACT

A round plate shape shoe for incorporation into a swash plate type compressor as an operative engaging element intervened between a rotatable swash plate and a reciprocal piston is structured to have a first flattened face slidably contacting the swash plate and a second face opposite to the first flattened face, the second face being formed with a recess for receiving a ball bearing, which has a spherical shape portion complementary with a part of the ball bearing and a round bore portion with a bottom. The spherical shape portion of the recess is concentric with the round bore portion.

2 Claims, 6 Drawing Figures

STRUCTURE OF A SHOE FOR A SWASH PLATE TYPE COMPRESSOR

FIELD OF THE INVENTION

The present invention relates to a swash plate type compressor for use in air conditioning systems for vehicles and, in particular, to an improved structure of the shoes incorporated into a swash plate type compressor for the purpose of providing means for strengthening the load assumed by the shoes.

BACKGROUND OF THE INVENTION

A typical swash plate type compressor as disclosed in, for example, U.S. Pat. No. 3,801,227 of Nakayama and U.S. Pat. No. 3,955,899 of Nakayama et al, having a pair of horizontal axially aligned cylinder blocks which form a combined block. Inside the combined block are formed axially extending cylinder bores, and the cylinder block is closed at both ends by front and rear housings, via valve plates. Centrally passing through the combined block, a drive shaft is rotatably supported by a suitable bearing means. To the middle of the drive shaft is fixed a swash plate operatively connected to, via ball bearings and shoes, double acting pistons slidably fitted in the cylinder bores. Thus, the rotating motion of the swash plate causes the reciprocal compressing motion of the pistons within the cylinder bores. The front and rear housings have refrigerant suction chambers and refrigerant discharge chambers, which are interconnected with the cylinder bores and are connectable to an outside air conditioning system by means of appropriate refrigerant flow pipelines. The above-mentioned respective shoes are normally shaped as a round plate having, at one side thereof, a flattened face slidably engaging with the swash plate. At the other side of the round plate, each shoe has a spherical recess for receiving therein the ball bearing. That is, the spherical recess of each shoe is shaped so as to be complementary with a part of the ball bearing, so that the entire surface of the spherical recess contacts a partial spherical surface of the ball bearing.

With the above-mentioned typical swash plate type compressor, when the compressor is used for compressing a refrigerant of the air conditioning system of a vehicle, the reciprocal pistons are susceptible to change in the speed of the compressing motion, since the compressor is driven by a drive force from the engine of the vehicle. Therefore, it often occurs that each piston of the compressor must assume an excess load in the case where the rotating speed of the engine of the vehicle is suddenly increased. Each piston of the compressor must also assume an excess load in the case where the compression of a liquid state refigerant must be carried out by the compressor due to unusual occurence of the direct introduction of the liquid state refrigerant into the compressor. On the other hand, during the ordinary and steady running state of the compressor, the load applied to the pistons thereof, as well as the shoes, is kept low. Therefore, pressure applied from the swash plate to the shoes is also kept low and distributed evenly over the entire surface of the flattened face of each shoe.

To the contrary, when each piston of the compressor must assume the above-mentioned excess load, the distribution of pressure applied from the swash plate to each shoe becomes quite uneven, in comparison with the case of the ordinary running state of the compressor. That is, the pressure is distributed in such a manner that a relatively high pressure is concentrated on a given central portion of each round shoe formed with the spherical recess. As a result, such central portion of each shoe must be subjected to an abrasion more rapidly than the other portions of each shoe surrounding the central portion. This rapid abrasion is caused by the frictional contact between the central portion and the swash plate under high pressure. In an extreme case, the frictional contact generates a high temperature friction heat causing the seizure of the shoe or shoes, whereby the compressor will finally be broken. The reason why the high pressure is concentratedly distributed in the central portion of each shoe is because when pressure is applied to each shoe from the swash plate, the central portion of each shoe being thinner than the other portion of the shoe is not able prevent a sufficient amount of resilient deformation occuring. Further, the central portion having a thinner thickness is easily affected by a temperature rise caused by the above-mentioned frictional heat. This fact results in the occurrence of the above-mentioned seizure of the shoe or shoes.

SUMMARY OF THE INVENTION

An object of the present invention is to provide a novel structure of a shoe for use in a swash plate type compressor, which is improved over the conventional structure of the shoe so as to be resistant to rapid abrasion or wear and seizure. In accordance with the present invention, there is provided a shoe generally formed in a round plate shape and incorporated into a swash plate type compressor for transmitting an axial force from a rotating swash plate secured to a drive shaft, via a ball bearing, to a piston of the compressor which applies an axially reciprocal compression effect to a refrigerant within a cylinder bore of the compressor, comprising: a first flattened face slidably contacting said swash plate while said swash plate rotates with said drive shaft; a second face opposite to said first flattened face, said second face being formed with a recess for receiving therein said ball bearing, said recess having a spherical shaped portion complementary with a part of said ball bearing and a round bore portion with a bottom thereof, said spherical shape portion being concentric with said round bore portion.

Preferably, the round portion of the recess of the shoe has a diameter the value of which is 40 through 85 percent of that of the diameter of the uppermost opening of the spherical shaped portion.

The present invention will become more apparent from the accompanying drawings, wherein.

Figure 1:
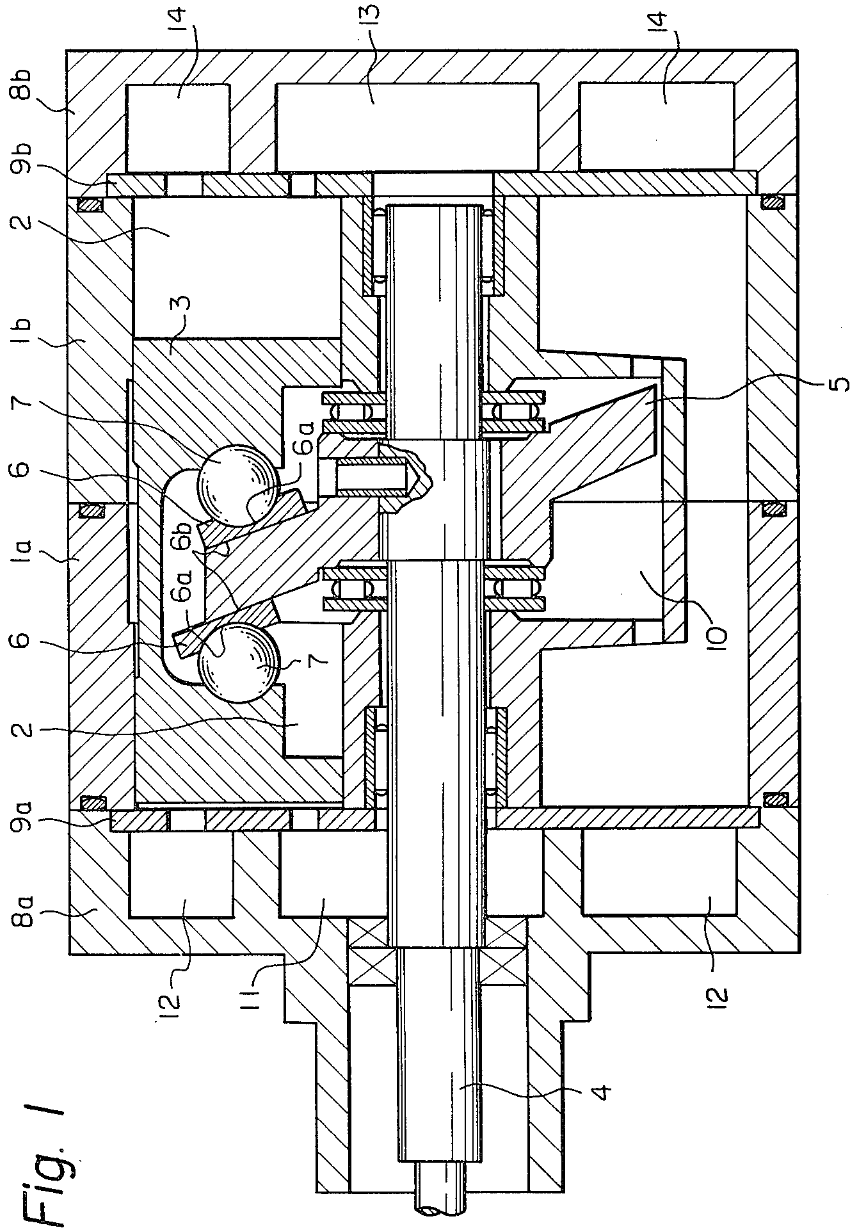
FIG. 1 is one longitudinal cross-sectional view of one typical swash plate type compressor.

Referring to FIG. 1, illustrating a typical swash plate type compressor of recent use, the compressor has a pair of cylinder blocks, i.e. a front cylinder block 1*a* and a rear cylinder block 1*b*, combined with each other in an axial alignment, and thereby forming a combined cylinder block. The combined cylinder block is provided with axially extending cylinder bores 2 arranged parallel with each other around the central axis of the combined cylinder block. The front end of the combined cylinder block is closed by a front housing 8*a*, via a valve plate 9*a*, and the rear end of the combined cylinder block is closed by a rear housing 8*b*, via a valve plate 9*b*. Coaxially passing through both cylinder blocks 1*a*, 1*b*, front housing 8*a*, and front valve plate 9*a*, a drive shaft 4 is rotatably supported by a suitable bearing means, and is provided with a swash plate 5 secured to the middle of the drive shaft 4. The swash plate 5 is operatively connected with, via ball bearings 7 and shoes 6, double acting multi-pistons 3 which are slidably fitted in the cylinder bores 2. The combined cylinder block is also provided with a swash plate chamber 10 past which the swash plate 5 rotates with the drive shaft 4. The front housing 8*a* and the rear housing 8*b* have refrigerant suction chambers 11 and 13, respectively, through which the refrigerant having returned from an outside air conditioning system is eventually sucked into the cylinder bores 2 in order to be subjected to compression. The front and rear housings 8*a* and 8*b* also have refrigerant discharge chambers 12, 14, respectively, through which the compressed refrigerant is discharged toward the outside air conditioning system. The compression of the refrigerant is attained by the reciprocal compressing motion of the pistons 3 within the cylinder bores 2, which is caused by the rotating motion of the swash plate 5 with the drive shaft 4. That is to say, an axial force for causing the reciprocal compressing motion of the pistons 3 is transmitted from the swash plate 5 to the pistons 3 by means of the shoes 6 and ball bearings 7. Each of the shoes 6 is a generally round plate element having one face thereof formed with a spherical recess 6*a* to receive therein the ball bearing 7 and the other face thereof formed as a flattened face 6*b* slidably contacting the swash plate 5. At this stage, referring to the box (A) of FIG. 3 together with FIG. 1, the spherical recess 6*a* of each shoe 6 is shaped so that the entire surface of the recess 6*a* evenly contacts the spherical surface of the ball bearing 7. Thus, during the ordinary steady running condition of the swash plate type compressor in which a load applied to the pistons 3 (FIG. 1) is kept low, the pressure acting on each of the shoes 6 is at a low-level, and distributes on the face 6*b* in the way as shown in the box (B) of FIG. 3. That is, the pressure distribution is considerably even. On the other hand, when a load applied to the piston 3 becomes extremely high, the pressure acting on each of the shoes 6 is distributed on the face 6*b* in the way as shown in the box (C) of FIG. 3. That is, an extremely high pressure acts on the central portion of the face 6*b* of each shoe 6. This extremely high pressure causes a local abrasion of each shoe 6 or an occurence of the seizure of each shoe.

Figure 2:
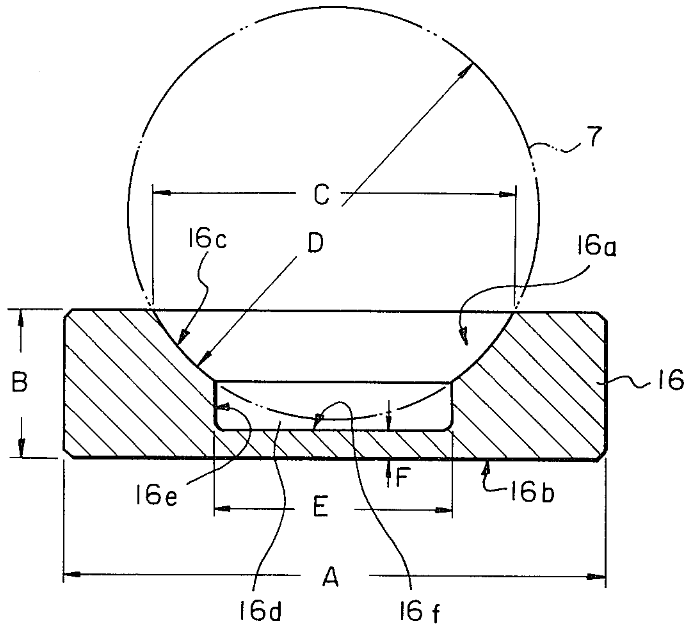
FIG. 2 is an enlarged cross-sectional view of a shoe according to a first embodiment of the present invention.
Figure 4:
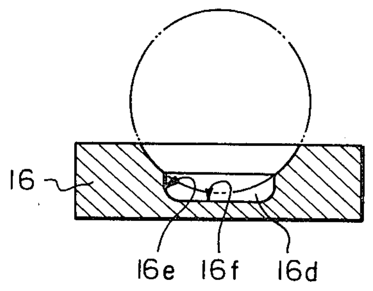
FIGS. 4 through 6 are cross-sectional views of shoes according to the second through fourth embodiments of the present invention.
Figure 5:
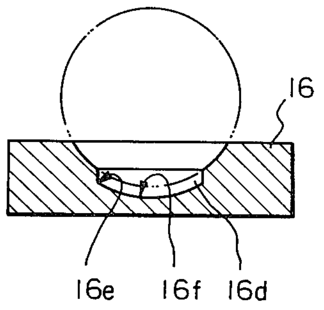
Figure 6:
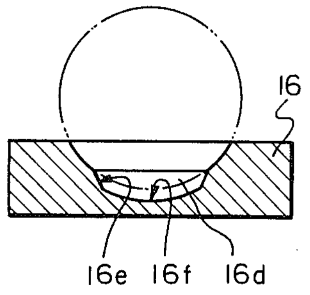

FIG. 2 illustrates the shoe of a first embodiment of the present invention. The shoe 16, generally formed in a round plate element having one face thereof formed with a recess 16*a* for receiving therein the ball bearing 7 (FIG. 1), and the other face thereof formed as a continuous flattened face 16*b* slidably contacting the swash plate 5 (FIG. 1). The recess 16*a* has an outer spherical portion 16*c* which is complementary with a part of the ball bearing 7 and a lower substantially round bore 16*d* with a side wall 16*e* and a bottom 16*f*. The lower round bore 16*d* is arranged so as to be concentric with the outer spherical portion 16*c*, and the depth of the lower round bore 16*d* is such that the bearing ball 7 received in the recess 16*a* does not contact the bottom 16*f*. The shoe 16 per se is made of a metallic material selected from ferrous materials, metalic materials containing copper and metalic materials containing aluminum. The shape of the lower round bore 16*d* of the recess 16*a* of each shoe 16 may be modified into those as illustrated in FIGS. 4 through 6. The bore 16*d* of FIG. 4 has a circular side wall 16*e* which is continuously connected to a flat bottom 16*f*, via a rounded corner. The bore 16*d* of FIG. 5 has a circular side wall 16*e* and a spherical bottom 16*f*. Further, the bore 16*d* of FIG. 6 has a circular and downwardly convergent side wall 16*e* and a spherical bottom 16*f*.

Figure 3:
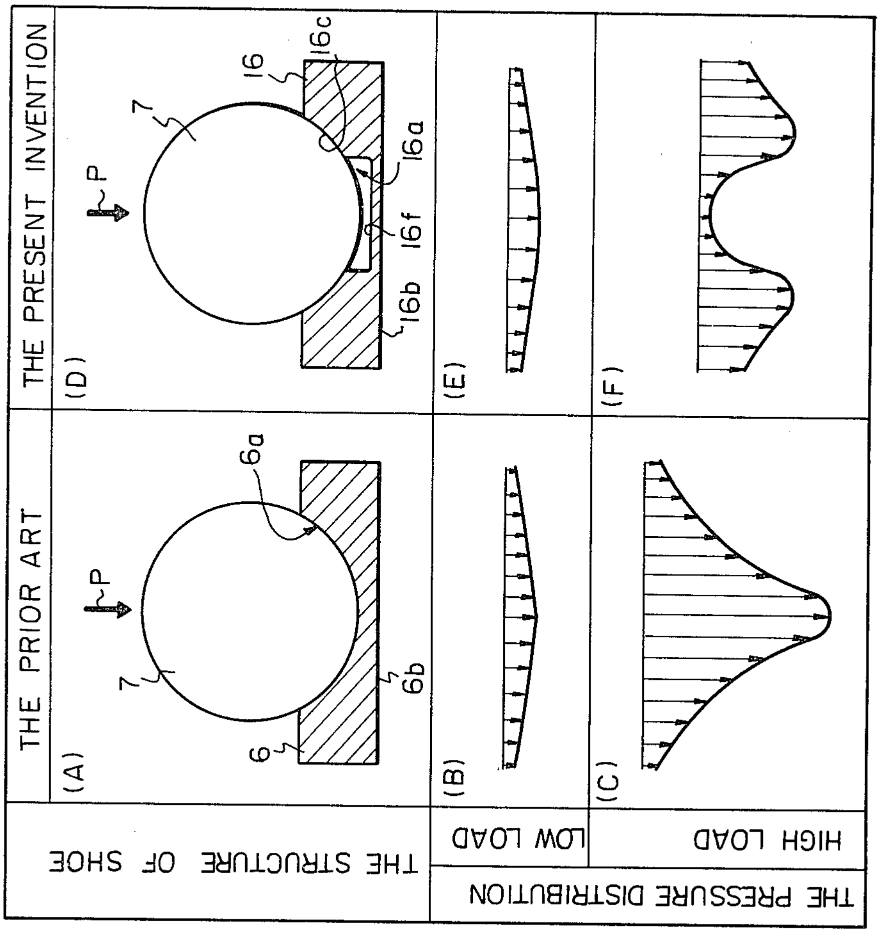
FIG. 3 is a diagram comparatively illustrating the pressure distribution of a shoe according to the present invention and the conventional shoe.

With the shoe of the present invention having the recess 16*a* of the above-mentioned diverse shapes, when the compressor is operated under a low load applied to the pistons 3 (FIG. 1), the pressure acting on the face 16*b* contacting with the swash plate 5 (FIG. 1), distributes the pressure in the way as shown in the box (E) of FIG. 3. That is, the level of the pressure is kept low, and the distribution of the pressure is considerably even. Therefore, neither appreciable abrasion of the shoes appears nor seizure of the shoes occurs. Of course, the swash plate 5 (FIG. 1) contacting with the shoes 16 is subjected to no damage due to the pressure. On the other hand, when a high load is applied to the pistons during the operation of the compressor, such high load application to the pistons causes a change in the pressure acting on the shoes 16. That is, the pressure acting on the face 16*b* of each shoe 16 is distributed in the way as shown in the box (F) of FIG. 3, because of the particular shape of the recess 16*a* of each shoe 16. It should be appreciated that the pressure level acting on the central portion of the shoe 16 is low, and that on the annular outside of the central portion, a relatively high pressure is distributed. It should further be appreciated that the rate of change in the pressure distribution on the annular outside of the central portion is quite gentle, compared with that in the pressure distribution in the case of the conventional shoe, as shown in the box (C) of FIG. 3.

At this stage, it should be noted that in the case of the shoes 16 of the present invention, the relatively high pressure is not concentrated into any partial area of the annular outside of the central portion of each shoe 16. Therefore, even if the load applied to the shoes 16 becomes considerably high, no abrasion of the shoes 16 takes place during the high load operation of the compressor.

As shown in the box (D) of FIG. 3, during the operation of the compressor, a pressure P designated by an arrow is applied from the ball bearing 7 to the shoe 16 receiving said ball bearing 7. However, since the ball bearing 7 contacts the spherical recess 16*c* and does not contact the bottom 16*f*, the shoe 16 bends under the effect of the pressure P so that the face 16*b* contacting the swash plate 5 (FIG. 1) is inwardly curved. Further, since the bottom 16*f* is thin, said bottom 16*f* can resiliently deform, even if the level of the pressure P is very large. Therefore, the eventual pressure acting on the central portion of each shoe 16 corresponding to the bottom 16*f* is kept low, as illustrated in the box (F) of FIG. 3. Although the pressure distribution on the face 16*b* of the shoe 16 is slightly changed in response to a change in the material of which the shoe 16 per se is made, the above-mentioned phenomenon always occurs irrespective of the change in the material of the shoe 16.

Further, the above-mentioned phenomenon becomes distinctive in the case where the thickness of the bottom 16*f* of each shoe 16 is uniform over the entrire extension of the bottom 16*f* of the bore 16*d*.

When the above-mentioned bending of the shoe 16 is taken into consideration, it is possible to adopt such a structure of each shoe 16 that the outer periphery of the face 16*b* of each shoe 16 is chamfered at a small chamfering angle. Provision of the chamfered portion for the face 16*b* of each shoe makes it possible to prevent the peripheral outer edge of the face 16*b* from contacting the swash plate 5 (FIG. 1) when the compressor is operated and when the face 16*b* of each shoe 16 is caused to bend due to the pressure P acting from the bearing ball 7. Further, provision of the chamfered portion for the outer periphery of the face 16*b* of each shoe 16 makes it possible to retain a lubricating oil in the chamfered portion while the compressor is operated. Therefore metal contact of the shoes 16 and the swash plate can be prevented. As a result, abrasion of the shoes 16 can be avoided. At this stage, it should be noted that the bore 16*d* of each shoe 16 is formed as a bore having the bottom 16*f*. This structure of the bore 16*d* with the bottom 16*f* contributes to preventing the lubricating oil from leaking from the surface of the face 16*b* into the bore 16*d*. Therefore, during the operating of the compressor, there is always retained an oil film between the face 16*b* of each shoe 16 and the surface of the swash plate 5 (FIG. 1). As a result, abrasion of the shoes 16, as well as occurence of the seizure of the shoes 16, can be prevented by the lubricating effect of the oil film.

With one example of the shoe 16 of the present invention having the dimensions A through F shown in FIG. 2, appropriate practical values of the dimensions E and F of the bore 16*d* were chosen to be 5 through 10 millimeters and 0.5 through 2 millimeters, respectively, in the case where the practical values of the dimensions A through D are 18 millimeters, 4.7 millimeters, 12 millimeters and 13.5 millimeters. At this stage, it was confirmed by the experiment of the operation of the compressor conducted by the inventors that the diameter E of the bore 16*d* should be 40 through 85 percent of the diameter C of the recess 16*a*. If the diameter E is below 40 percent of the diameter C, it was found that the foregoing advantages of the present invention cannot be accomplished. While, if the diameter E is above 85 percent of the diameter C, the surface area of the spherical portion 16*c* receiving the bearing ball 7 (FIG. 1) becomes small. Therefore, it was found that the shoe is unable to assume the load applied thereto.

From the foregoing description of the embodiments of the present invention, it will be understood that the structure of a shoe according to the present invention can prevent high pressure from being applied to a partial portion of the shoe, whereby rapid abrasion of the shoe, as well as the seizure of the shoe, can be avoided. It should be consequently understood that application of the shoe according to the present invention to a swash plate type compressor can prolong the operation life of the compressor per se.

What is claimed is:

1. A shoe generally formed in a round shape and incorporated into a swash plate type compressor for transmitting an axial force from a rotating swash plate secured to a drive shaft, via a ball bearing, to a piston of a compressor which applies an axially reciprocal compression effect to a refrigerant within a cylinder bore of the compressor, comprising:

a first flattened face slidably contacting said swash plate while said swash plate rotates with said drive shaft;

a second face opposite to said first flattened face, said second face being formed with a recess for receiving therein said ball bearing, said recess having a spherical shape portion complementary with a part of said ball bearing and a round bore portion with a bottom thereof, said bottom of said round bore portion being a spherical surface, said round bore portion having a diameter between 40 and 85% of the diameter of said spherical shape portion at said second face, the thickness of said shoe between the bottom of said round bore portion and said first flattened face being in the range of 0.5 to 2 millimeters, said spherical shape portion being concentric with said round bore portion and wherein there is no connecting passage between said round bore portion and said first flattened face.

2. A shoe generally formed in a round plate shape and incorporated into a swash plate type compressor for transmitting an axial force from a rotating swash plate secured to a drive shaft, via a ball bearing, to a piston of a compressor which applies an axially reciprocal compression effect to a refrigerant within a cylinder bore of the compressor, comprising:

a first flattened face slidably contacting said swash plate while said swash plate rotates with said drive shaft;

a second face opposite to said first flattened face, said second face being formed with a recess for receiving therein said ball bearing, said recess having a spherical shape portion complementary with a part of said ball bearing and a round bore portion with a bottom thereof, said round bore portion of said recess having a cylindrical and downwardly convergent side wall connecting to said bottom which is formed as a spherical surface, said round bore portion having a diameter between 40 and 85% of the diameter of said spherical shape portion at said second face, the thickness of said shoe between the bottom of said round bore portion and said first flattened face being in the range of 0.5 to 2 millimeters, said spherical shape portion being concentric with said round bore portion and wherein there is no connecting passage between said round bore portion and said first flattened face.

* * * * *

UNITED STATES PATENT AND TRADEMARK OFFICE
CERTIFICATE OF CORRECTION

PATENT NO. : 4,329,913

DATED : May 18, 1982

INVENTOR(S) : Shozo Nakayama, et al

It is certified that error appears in the above—identified patent and that said Letters Patent is hereby corrected as shown below:

Column 2, line 17: "prevent" should be --to prevent--.
Column 2, line 18: "occuring" should be --from occurring--.
Column 5, line 3, "entrire" should be --entire--.

Signed and Sealed this

*Eighth* Day of *February 1983*

[SEAL]

*Attest:*

GERALD J. MOSSINGHOFF

*Attesting Officer* *Commissioner of Patents and Trademarks*